P. F. VAN KEEP.
SPRING WHEEL.
APPLICATION FILED JUNE 3, 1908.

1,012,033.

Patented Dec. 19, 1911.
2 SHEETS—SHEET 1.

Witnesses
Jesse N. Sutton
M. L. Higgins

Inventor.
Paulus Franciskus van Keep
by Harry Orth Jr. Atty.

P. F. VAN KEEP.
SPRING WHEEL.
APPLICATION FILED JUNE 3, 1908.

1,012,033.  
Patented Dec. 19, 1911  
2 SHEETS—SHEET 2.

Witnesses.  
Jesse N. Lutton  
M. L. Higgins

Inventor.  
Paulus Franciskus van Keep  
by Henry Orth Jr.  
Atty.

UNITED STATES PATENT OFFICE.

PAULUS FRANCISKUS van KEEP, OF BREDA, NETHERLANDS, ASSIGNOR TO THE FIRM OF AMSTERDAMSCHE MAATSCHAPPIJ TOT EXPLOITATIE VAN UITVINDINGEN, OF AMSTERDAM, NETHERLANDS.

SPRING-WHEEL.

1,012,033.  Specification of Letters Patent.  Patented Dec. 19, 1911.

Application filed June 3, 1908. Serial No. 436,452.

*To all whom it may concern:*

Be it known that I, PAULUS FRANCISKUS VAN KEEP, a subject of the Queen of the Netherlands, residing at Breda, Netherlands, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to spring wheels, and has for its object to provide suitable spring connections between the hub and felly of the wheel, said spring connections combining the functions of both a spiral and a leaf spring.

In structures heretofore known, the action of the springs between the felly and rim is either too weak to supplant the action of a pneumatic tire, or not strong enough to meet the demands upon sudden changing of speed, or in sudden braking. Sudden speed changes produce a relative rotation between hub and felly, due to the inertia of the moving vehicle or automobile, so that there are simultaneously produced in the spring spoke a bending moment and tension.

Figure 1:
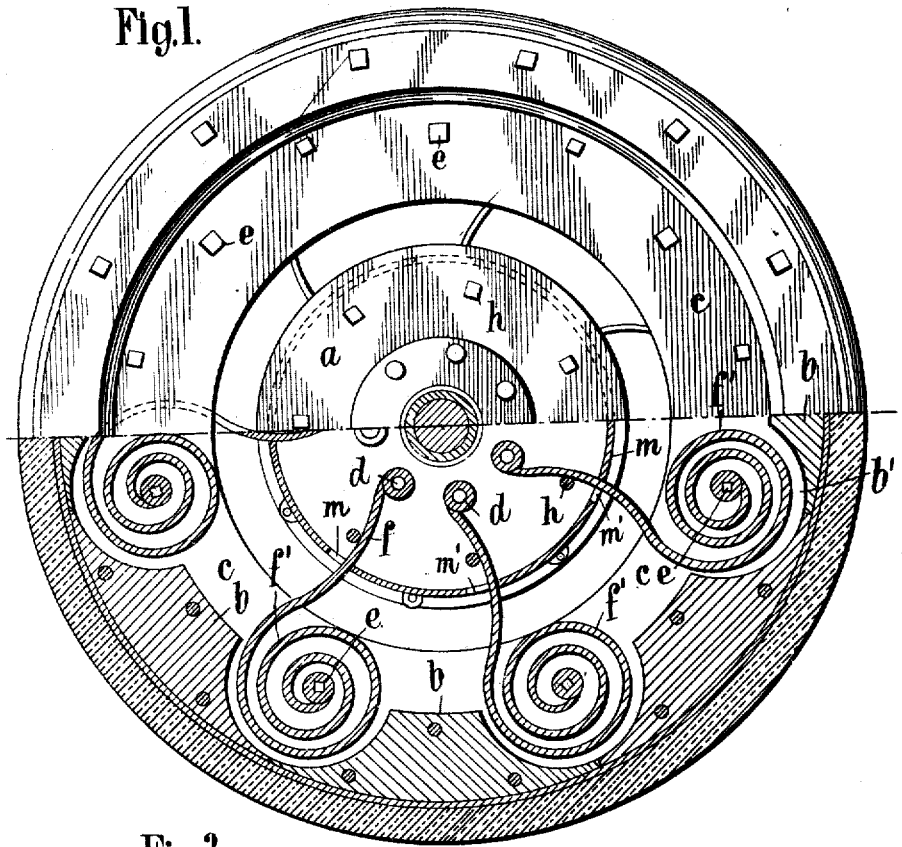
Figures 2, 3, 4, 5:
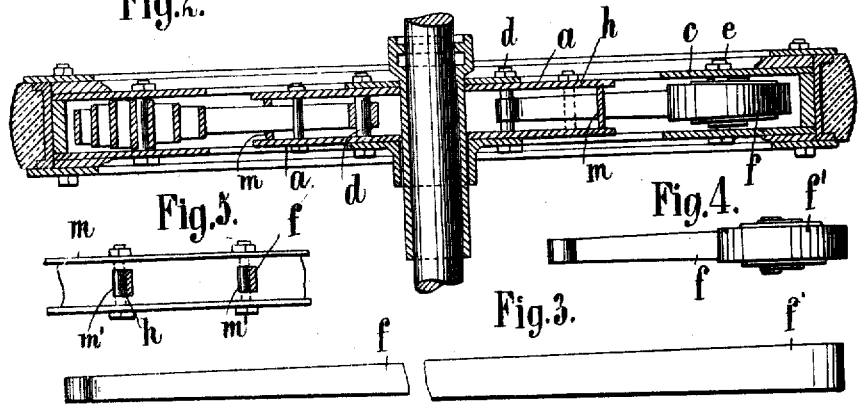
Figure 6:
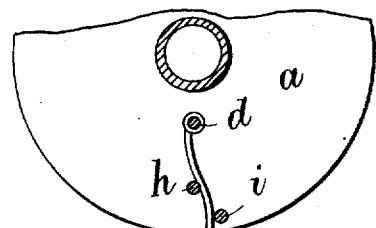
Figure 7:
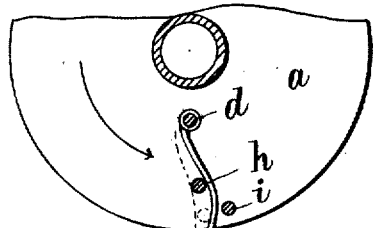
Figure 8:
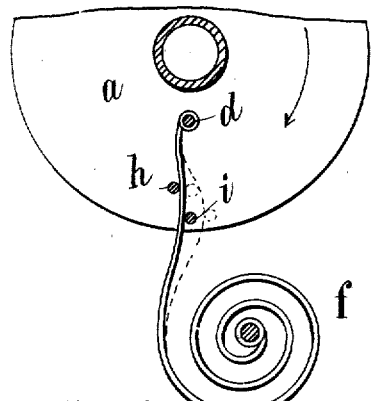
Figure 9:
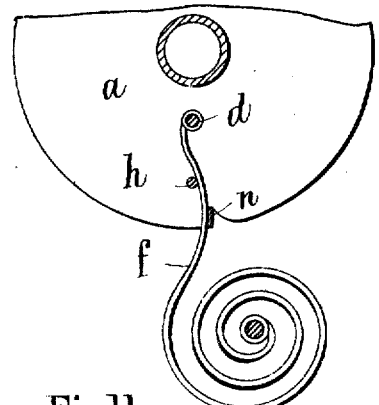
Figure 10:
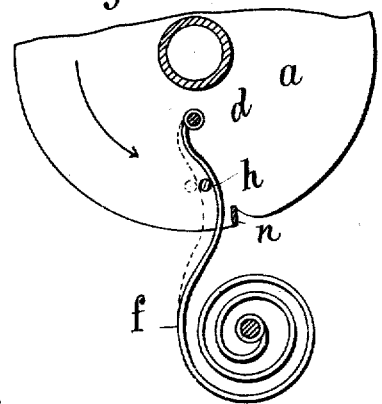
Figure 11:
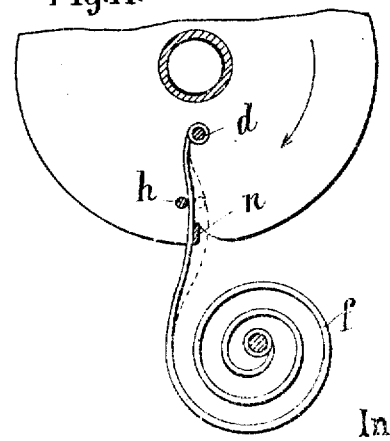

Referring to the accompanying drawings, in which like parts are similarly designated—Figure 1 illustrates a wheel embodying my invention, partly in elevation and partly in vertical longitudinal section. Fig. 2 is a transverse section thereof. Fig. 3 is a developed plan view of a spring spoke. Fig. 4 is an elevation of one of the spring spokes. Fig. 5 is a detail, showing peripheral perforations through which the spoke passes into the hub. Fig. 6 is a diagram showing the normal position of one of the spokes. Fig. 7 indicates the flexure due to relative rotation of the hub with respect to the felly in the direction of the arrow. Fig. 8 indicates the flexure due to the opposite rotation. Fig. 9 is a modification. Fig. 10 is a view similar to Fig. 7 embodying the modification. Fig. 11 is a view similar to Fig. 8, embodying the modification.

In all of the figures I show a spring spoke coiled into a spiral at one end, said spiral end being connected at the center of the spiral to the felly, the spring preferably decreasing in width from its end at the center of the spiral toward its opposite end, which is formed as a leaf spring and secured in the hub. That portion of the spring which enters the hub is either radial or approximately radial to both hub and spiral center. For that portion of each spoke which is designed to have leaf spring action I provide two abutments or bearings, here shown as mounted in the hub at points located intermediate the ends of the spoke and arranged on circles of different radii.

Referring more particularly to Figs. 1 and 2, each spring spoke *f* which is shown in developed plan in Fig. 3, and in elevation in Fig. 4, is secured in the felly composed of sections *b* having circular pockets *b'* between them, and these sections are secured between plates *c*. Passing through the plates *c* are suitable bolts *e* to which the spiral end *f'* of each spoke is secured and fixed against rotation.

The hub, which may be of any desired structure so long as it employs two spaced plates, as *a*, has the other end or leaf portion of the spring *f* secured thereto by means of bolts *d*. This hub is closed or not, as desired, and in Figs. 1 and 2 I have shown a ring *m* closing the hub, said ring being provided with perforations *m'* through which the leaf portion of the spring *f* passes. Intermediate the ring *m* and the end of the spring held by bolt *d* is a bolt or pin *h*. Under normal conditions, or when the wheel is at rest, one side of each spoke is quite close to or has bearing against one edge of the perforations *m'*, while the other side is in similar relation to the bolt or pin *h*.

In lieu of the ring *m* and perforation *m'* I may use an additional bolt, such as shown at *i* in Figs. 6 to 8, or I may form a cut in the side plate *a* of the hub and turn the cut portion in to form a lug *n*, as shown in Figs. 9, 10 and 11; the bolt or pin *i* and lugs *n* forming the equivalent of the bearing point on one edge of the perforation *m'* in ring *m*.

The rotation of the hub with respect to the felly in the direction shown by the arrow in Fig. 7, flexes the spring portion, or the hub end of the spring *f* from the dotted line position shown in Fig. 7 to the full line position. This flexure has a tendency to bend the spoke.

Relative rotation of the hub with respect to the felly in the direction of the arrow Fig. 8 will cause the hub end of the spring to be flexed from dotted line position to the full line position shown in Fig. 8, that is, there will be a tendency to stretch the spoke.

The abutments, as noted above, are arranged on circles of different radii. If, therefore, the springs are deflected in the one direction on an increase in the speed, and deflected in the other direction, when the brakes are applied, then the parts of the springs which are subjected to the greatest stresses and strains alternate with each other, so that the strain has less effect than if the maximum strain and stress, when the springs were deflected in the two directions, occurred at the same spot.

By diminishing the width of the spring from the center of the spiral at the felly to the end of the leaf portion in the hub, the spiral portion is given a greater strength, while the radial or approximately radial portion, acting as the leaf spring is rendered more flexible.

Any suitable tire may be used in connection with the felly.

I claim:—

1. In a spring wheel, the combination with a felly and a hub, of a spring spoke having a spiral end connected to the felly and a leaf spring end connected to the hub, and abutments on the hub between the points of connection of said spokes with the felly and hub and on opposite sides of the spokes and independent of the end connections to produce flexure of the leaf spring portion upon relative rotation of the hub and felly in either direction.

2. In a spring wheel, the combination with a felly and a hub; of a spring spoke having a spiral end connected to the felly and a leaf spring end connected to the hub, and abutments on the hub on opposite sides of the spokes intermediate of the ends of the spokes at different radial distances from the center of the wheel to produce flexure of the leaf spring upon relative rotation of the hub and felly.

3. In a spring wheel, the combination with the felly and a hub; of a spring spoke having a spiral end connected to the felly and a leaf spring end connected to the hub and means on the hub at different radial distances from its center and on each side of the leaf spring portion to produce flexure of the leaf spring portion upon relative rotation of the felly and hub.

4. In a spring wheel, the combination with a felly and a hub; of a spring spoke having a spiral end connected to the felly and a leaf spring portion connected to the hub, said spoke increasing in width from the hub end to the end at the center of the spiral, a lateral abutment on the hub on each side of the leaf spring portion of each spoke, said abutments being at different radial distances from the center of the wheel.

In testimony that I claim the foregoing as my invention, I have signed my name in presence of two subscribing witnesses.

PAULUS FRANCISKUS van KEEP.

Witnesses:
A. E. M. RÖCEE,
ADELEUR.